(12) United States Patent
Vargas-Hurlston et al.

(10) Patent No.: US 6,750,813 B2
(45) Date of Patent: Jun. 15, 2004

(54) POSITION OPTIMIZED WIRELESS COMMUNICATION

(75) Inventors: Sarah Vargas-Hurlston, Chapel Hill, NC (US); Paul Robert Runkle, Durham, NC (US)

(73) Assignee: MCNC Research & Development Institute, Research Triangle Park, NC (US)

( * ) Notice: Subject to any disclaimer, the term of this patent is extended or adjusted under 35 U.S.C. 154(b) by 0 days.

(21) Appl. No.: 10/202,311

(22) Filed: Jul. 24, 2002

(65) Prior Publication Data

US 2004/0017310 A1 Jan. 29, 2004

(51) Int. Cl.[7] ............................. G01S 5/02; H04B 7/185
(52) U.S. Cl. ............................. 342/357.09; 342/357.1; 701/213; 455/456.1
(58) Field of Search .................... 342/357.1, 357.09, 342/357.06; 701/213; 455/522, 456.1

(56) References Cited

U.S. PATENT DOCUMENTS

| | | | |
|---|---|---|---|
| 5,450,615 A | 9/1995 | Fortune et al. | |
| 5,572,221 A | 11/1996 | Marlevi et al. | |
| 6,084,544 A | 7/2000 | Camp, Jr. | |
| 6,104,338 A | 8/2000 | Krasner | |
| 6,133,874 A | 10/2000 | Krasner | |
| 6,449,484 B1 * | 9/2002 | Grubeck et al. | 455/450 |

FOREIGN PATENT DOCUMENTS

| | | |
|---|---|---|
| WO | WO 01/31945 | 5/2001 |

* cited by examiner

Primary Examiner—Theodore M. Blum
(74) Attorney, Agent, or Firm—Miller Patent Services; Jerry A. Miller

(57) ABSTRACT

A wireless communication base station consistent with certain embodiments of the present invention collects user transmissions and creates and maintains a database storing data that relates communication parameters to a geographic location. A base station receiver receives data packets containing data describing a geographic location of a mobile communication node. The base station predicts a future geographic location of the mobile communication node, and transmits communication parameters to the mobile communication node associated with the predicted future geographic location. The mobile communication node consistent with certain embodiments of the invention has a GPS positioning device that determines a geographic location of the communication node. A transceiver transmits data representing the geographic location and receives data representing communication parameters determined as a function of the data representing the geographic location. The mobile communication node adjusts its communication parameters in response thereto for the predicted geographic location.

51 Claims, 6 Drawing Sheets

POSITION OPTIMIZED WIRELESS COMMUNICATION

FIELD OF THE INVENTION

This invention relates generally to the field of wireless communication. More particularly, this invention in certain embodiments relates to a mechanism for improvement of service quality in areas where wireless connections are poor.

BACKGROUND OF THE INVENTION

Most users of wireless telecommunications products such as wireless telephones have encountered situations wherein a particular physical location frequently experiences poor quality of service (QoS). When such a region is passed through, the user may experience drop-outs in reception and/or transmission, and perhaps a lost call. Similar problems can exist in any other wireless communication contexts such as with wireless communications using cellular telephone networks, IEEE802.11 networks, Bluetooth® networks, paging networks, text messaging networks, Personal Digital Assistant (PDA) communication networks and any other network or format for wireless communication. Whether digital data, digital voice data or multimedia data are being communicated, this problem can produce undesired loss of information and aggravation to the user.

SUMMARY OF THE INVENTION

The present invention relates generally to optimizing wireless communications. Objects, advantages and features of the invention will become apparent to those skilled in the art upon consideration of the following detailed description of the invention.

A wireless communication base station consistent with certain embodiments of the present invention collects user transmissions and creates a database storing data that relates communication parameters to a geographic location. A base station receiver receives data packets containing data describing a geographic location of a mobile communication node. The base station predicts a future geographic location of the mobile communication node, and transmits communication parameters to the mobile communication node associated with the predicted future geographic location. The mobile communication node consistent with certain embodiments of the invention has a GPS positioning device that determines a geographic location of the communication node. A transceiver transmits data representing the geographic location and receives data representing communication parameters determined as a function of the data representing the geographic location. The mobile communication node adjusts its communication parameters in response thereto for the predicted geographic location.

A communication method, consistent with certain embodiments of the present invention involves receiving a transmission containing location data for a mobile communication node; predicting a future location of the mobile communication node; and transmitting a signal that adjusts a communication parameter of the mobile transmitter node based upon the predicted future location of the mobile communication node and/or historic network performance data. Another communication method consistent with certain embodiments of the present invention involves transmitting a data packet from a mobile communication node to a base station, the data packet containing data representing a geographic location of the mobile communication node; and receiving a data packet from the base station that adjusts a communication parameter of the mobile communication node, the communication parameter being based upon the geographic location of the mobile communication node.

Another communication method, consistent with certain embodiments of the present invention is carried out by receiving a data packet transmitted from a mobile communication node to a base station, the data packet containing location data representing a geographic location of the mobile communication node; and adjusting at least one communication parameter based upon the geographic location of the mobile communication node. The communication parameter may be a base station and/or a mobile node communication parameter.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
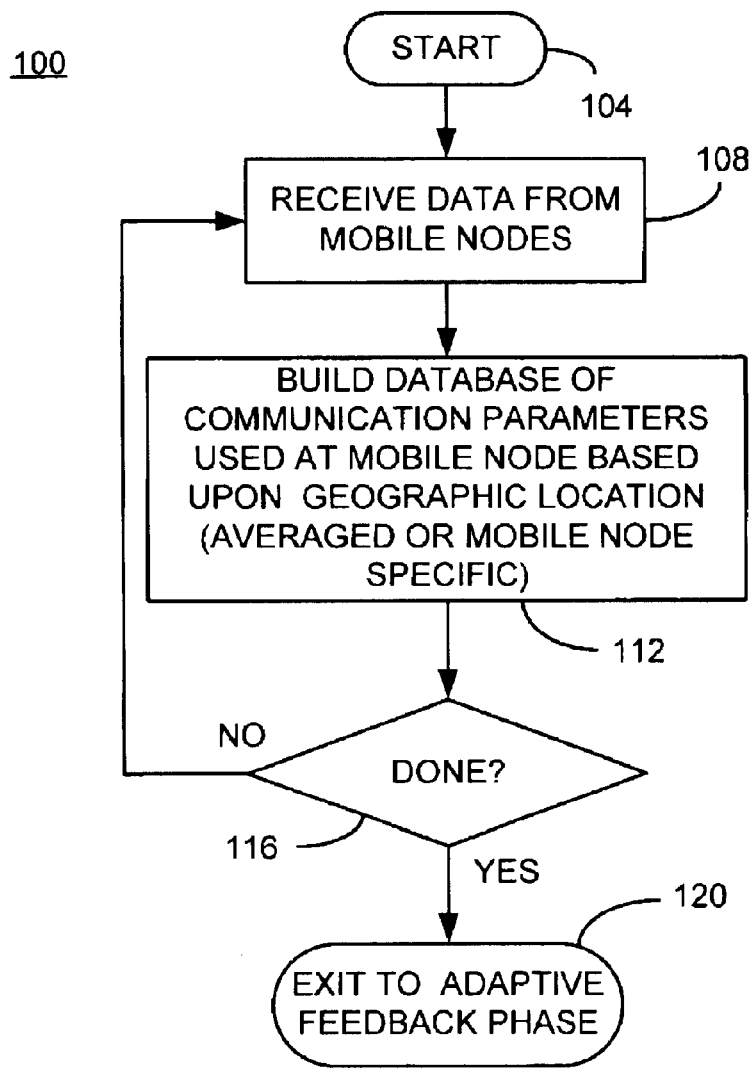
FIG. 1 is a flow chart describing a data measurement phase of a process consistent with certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In mobile wireless communication scenarios, geographic and topographic conditions often result in there being geographic regions wherein wireless communication quality varies from excellent to poor or non-existent. This is the case without regard for the frequency band or type of communication (e.g., cellular, or IEEE802.11(b)). In a cellular telephone environment, this can result in a dropped telephone call or inaccessibility. In other environments, this can cause loss of data or inefficient communications. Due to geographic constraints, it is likely that such regions of poor or non-existent wireless communication quality will always exist. For example achieving full cellular coverage that accounts for signal loss due to buildings, tunnels, mountains, bridges, etc. will likely be prohibitively expensive. In the case of wireless local area network (WLAN) communications, e.g., connecting to hand held computers, laptop computers, portable terminals and the like, similar barriers such as walls, cabinets, floors, ceilings, furniture, etc. produce similar geographic regions with variations in the ability to conduct wireless communications.

Fortunately, although such regions of poor communication exist, movement through regions within many wireless networks are somewhat predictable. For example, users of a mobile wireless telephone network often travel along predictable paths such as highways and populated areas, frequently traversing the same paths on a frequent basis. Similarly, mobile users of a wireless LAN or wireless telephone within a building generally follow predictable patterns within the building (e.g., hallways and predictable parts of rooms. This leads to an ability to predict with a reasonable degree of accuracy where mobile communication node is moving within a network. For purposes of this document, a region of coverage of a particular fixed station (e.g., a base station) is referred to as a "cell" without regard for whether or not the network environment is that of a cellular network. Similarly, the term "user" can be used interchangeably with the more generic term "mobile communication node" without there necessarily being a connotation that a human "user" is required as a part of the communication, since communication with unmanned devices can also be carried out utilizing the principles of the present invention.

Thus, in accordance with certain embodiments of the present invention, transmissions from such geographic regions can be mapped and tracked at a central location such as a fixed base station using a mobile communication node with position identifying equipment such as GPS (global positioning system) enabled transceivers. Once a database of such communications parameters is established, it can be utilized to adjust transmission parameters of the mobile communication node and/or the base station to optimize communications with that node. In cases where a communication null (or region with very poor quality of service) is expected, particularly in the case of digital data, the data can be buffered for transmission at a later time when the mobile communication node is expected to have cleared the null region.

In realizing embodiments of the present invention, two distinct phases of operation can be visualized. A first phase focuses on data acquisition and cataloging in a database. This data are acquired by monitoring transmitted data from the mobile communication nodes. A second phase uses this data to provide feedback to the mobile communication nodes that can be used to set various parameters of the mobile communication nodes. This data can also be used to adjust communication parameters of the base station. These two phases, of course, can be integrated into a continuous flow of operation, or the two activities can be carried out in parallel, or the two activities can be carried out in an alternating sequence without departing from the present invention. However, in order to more clearly present the two operations, they are discussed as though they are carried out sequentially, and this should not be considered limiting. Those skilled in the art will appreciate many variations that can be made upon consideration of this teaching without departing from the present invention.

Turning now to FIG. 1, a flow chart of one embodiment of the data acquisition or data measurement phase is illustrated as process 100 starting at 104. As data are received at a central location (e.g., a base station) from mobile communication nodes in the communication network at 108, the data are cataloged as records in a database at 112. The database maintains information relating various communication parameters to a geographic location. The geographic location is transmitted from the mobile communication node to the transmitter along with other information. Thus, the present invention presumes that the mobile communication node has GPS or other positioning capability or that geographical position information can somehow be triangulated or otherwise determined. Examples of the type of data that might be cataloged in addition to positioning data can include, but are not limited to, antenna settings (e.g., for diversity or smart antenna arrays), transmitted power, retry counter data, drop-out data, received signal quality, channel, data rate (possibly including but not limited to forward error correction, puncturing, interleaving and/or modulation), equalization parameters, etc. Once the database has been built to a desired degree at 116, the process proceeds to an adaptive feedback phase at 120. Those skilled in the art, however, will recognize that maintenance of the database is an ongoing process that can be carried out on a continuous basis.

Figure 2:
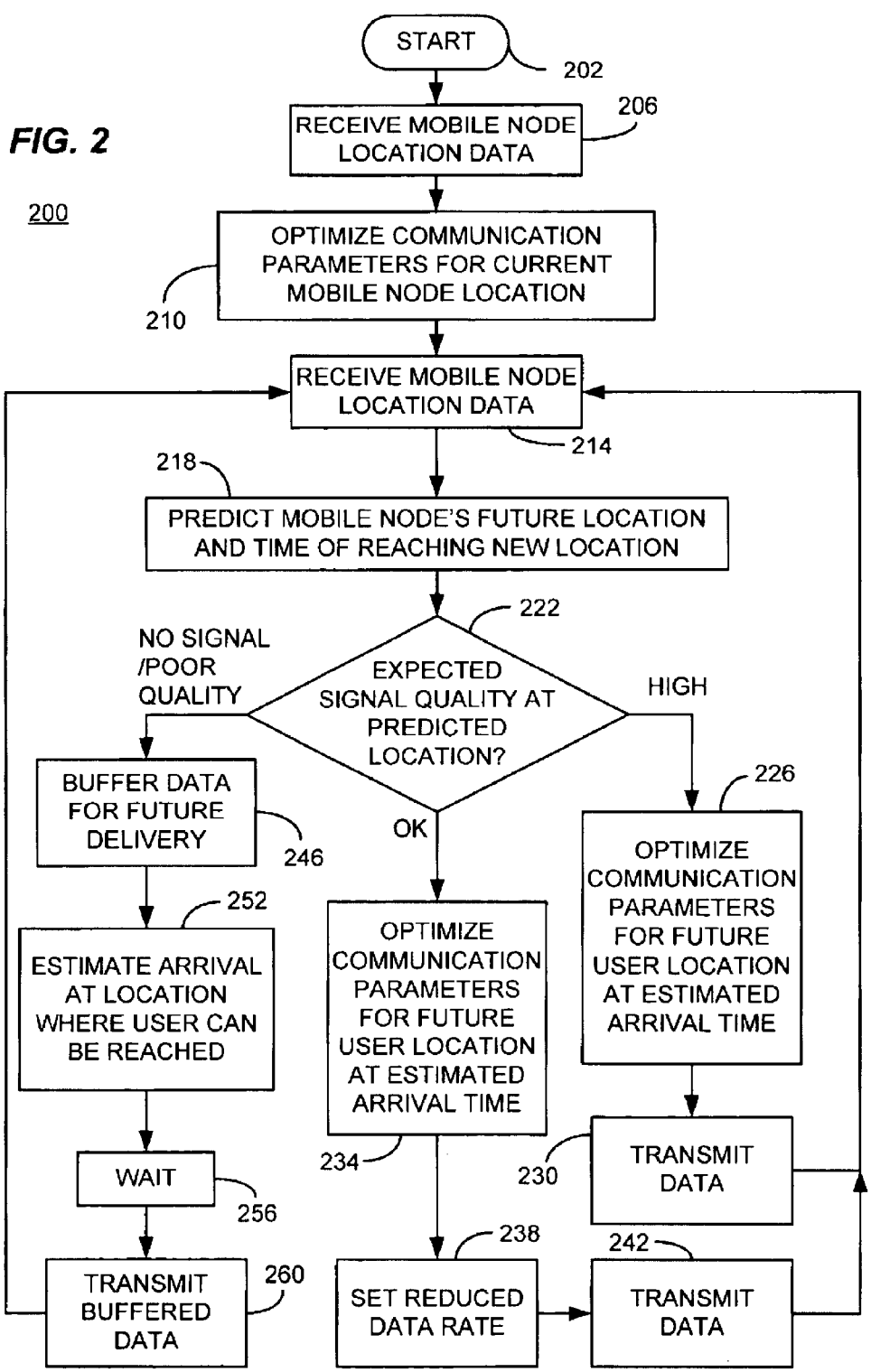
FIG. 2 is an adaptive feedback phase of a process consistent with certain embodiments of the present invention.

FIG. 2 illustrates an embodiment of the adaptive feedback phase process 200 starting at 202. In this process, the data compiled in the database as described in process 100 are used to adapt the communication parameters of the mobile communication node and/or the base station. At 206, the base station receives a transmission from the mobile user. In certain preferred implementations, the data received are in the form of data packets, at least one of which contains data which provide location information describing the current location of the mobile communication node. Responsive to this transmission, the base node can look up the current location of the mobile communication node and determine a set of (hopefully) optimal communication parameters for use by the mobile communication node at 210, which can then be sent to the mobile communication node. The mobile communication node can then proceed with communication using the set of communication parameters received from the base station relative to the mobile communication node's current geographic position. Additionally, the base station may adjust its own communication parameters based upon the data received from the mobile communication node in an attempt to optimize performance.

At 206, the mobile communication node's location is registered with the base station. Further transmissions are received from the mobile communication node defining its current location and movement at 214. By use of multiple transmissions from the mobile communication node, the location and movement of the mobile communication node can be tracked by the base node. Using this data, the base node can predict (e.g., by velocity and time, historic movement, etc.) a future location and time for the mobile communication node at 218.

Several methods can be used in accordance with certain embodiments of the present invention to predict a future location. In one embodiment the predicting uses historical movement as a guide and involves receiving multiple sets of location data for the mobile communication node, and comparing the multiple sets of location data with stored location data to predict a future location. Another method consistent with certain embodiments of the invention uses time, direction and velocity by receiving multiple sets of location data for the mobile communication node and times associated with each set of location data and calculating a predicted location by determining a direction and a velocity for movement of the mobile communication node. Other techniques can also be used without departing from the present invention.

The base station can also determine from the database that such future locations may contain regions with high dropout rate or regions from which signals have never been received. Thus, the base station can predict that the expected signal quality will fall within one of several categories as shown in 222. In the case of a region with high signal quality, the base station can send optimized communication parameters to the mobile communication node at a time appropriate for communication from the predicted location at 226. The mobile communication node can then communicate using these communication parameters and transmit at a high or maximum data rate at 230. Additionally, the base station can adjust its own communication parameters to optimize communication with the mobile communication node. The process then returns to 214 where the current location of the mobile communication node is updated and the process repeated.

In the event more marginal coverage (shown in FIG. 2 as "OK") is anticipated at the predicted location, the communication parameters for the mobile communication node are again optimized by the base station at 234 for the geographic region, but the data rate is reduced somewhat at 238 to facilitate more reliable communication when the data are transmitted at 242. Control then passes to 214.

When the predicted location is expected to have very poor signal quality or a dropout can be expected, data destined for transmission can be buffered at 246 until a time when it is predicted that the user will be within a region that can support reliable communication. Arrival time at such a location and time is predicted at 252 and the process waits at 256 until the estimated time is reached. The buffered data are then transmitted at 260 and control returns to 214 so the data acquisition and tracking of movement of the mobile communication node can continue.

Figure 3:
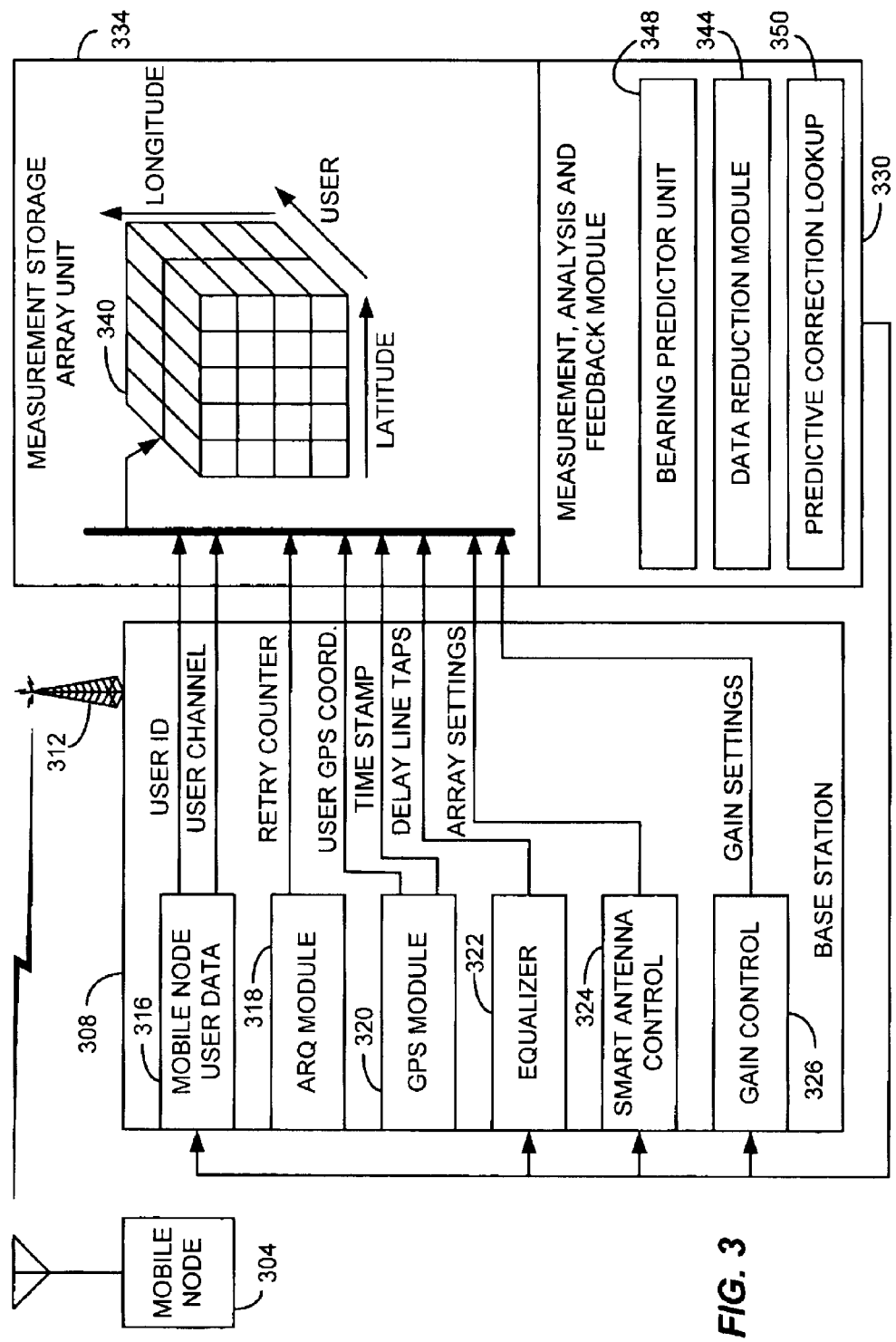
FIG. 3 is a block diagram of a base station device consistent with certain embodiments of the present invention.

Referring now to FIG. 3, a block diagram illustrating a base station arrangement consistent with certain embodiments of the present invention is illustrated in communication with a mobile communication node 304. The base station arrangement has a base station 308 that receives and transmits data via an antenna 312 from the mobile communication node 304 in a more or less conventional manner. Software variables or I/O registers are depicted within base station 308. These variables or registers are shown as the following modules: mobile communication node user data 316, ARQ module 318, GPS module 320, channel equalization module 322, smart antenna control 324 and gain control 326. In the case of a cellular telephone implementation, such variables may be available from the systems run by certain service providers. A limited set of these variables are written by a measurement analysis and feedback module 330. This variable subset is indicated by the arrows extending from the measurement analysis and feedback module 330 to the base station. This data are stored in a measurement storage array unit 334. In one embodiment, the data are stored in a three dimensional array of recording memory that is indexed by user, longitude and latitude, as depicted by the cube of data 340, but this should not be considered limiting.

During initial operation of the device as previously described, the primary function is data collection for the purpose of building up initial channel statistics. Depending on storage capacity and usage patterns, data can be collected for either all mobile communication nodes entering a particular cell or for a random selected group of mobile communications nodes or users. For the duration of connection of a given mobile communication node or user, i.e., prior to any handoff or drop, statistics are collected on each packet sent or received by the mobile communication node. The specific statistics which would be collected can include, but are not limited to, those variables shown in the base station, namely: a user or mobile communication node identifier, channel, retry counter, mobile communication node GPS coordinates, time stamp, equalizer delay line tap values, smart antenna array settings and gain settings. All or some of these variables and/or others can be used without departing from the present invention.

Because of the large amount of data that are collected, it is desirable to store the data collected during a measurement cycle in an organized fashion. One preferred implementation has a database containing an array of data structures, where each record can be queried according to three main variables: user ID, and latitude and longitude of position that the packet was sent from, as previously mentioned. This can be visualized as the illustrated three dimensional array 340. Depending on the time resolution appropriate for the storage, it might be possible that each element in the array might contain more than one data structure describing specific packet statistics. If necessary for compactness, data can be expressed as average statistics for each channel during a time period. Additional simplification could be achieved by placing constraints on records which would be stored such as a minimum or maximum ARQ value, or specific events such as call drops.

When GPS is used as the positioning mechanism, the resolution available in identification of a geographic location is much higher than is necessary for many applications. Thus, when a higher resolution positioning mechanism is used than is needed, regions of geography can be defined by rounding off or truncating a particular position to obtain a more manageable granularity in the set of geographic locations. Other techniques will occur to those skilled in the art, upon consideration of this teaching, for defining such regions without departing from the present invention.

Elements contained in an exemplary data structure might include: (1) number of packet retransmissions, (2) current equalizer tap values, (3) mobile channel identifier (which channel and which mobile communication node), (4) time of packet arrival, (5) latitude and longitude from GPS, (6) received rf power, and (7) record number of collection for that mobile communication node (used for ordering purposes). Once the database has been filled with records, or a specific startup time has passed (or some other criterion is met), measurement can stop until either a predefined period of time had passed or until mobile communication nodes begin to experience high packet loss, or some other criterion is met.

In the intervening period between measurements, the measurement analysis and feedback unit 330 operates to control operation of the mobile communication nodes such as 304. This unit 330 contains a data reduction module 344 and a bearing predictor unit 348 that are responsible for reducing the array data into meaningful trends so that appropriate look-ahead feedback could be applied to the mobile communication nodes within the cell. In the exemplary case of a cellular (or similar) communication network, a first function of this unit 330 is collection of a short packet buffer as part of the handoff procedure when a new user enters the cell or during call initiation. Analogous functions can take place in other types of networks. This buffer operates in a FIFO fashion so that a very short record is captured requiring only limited storage capability. The structure of the captured record can be identical to records in the large database of records stored as 340 and captured during the measurement period.

Since a road structure, building layout, etc., represents a constrained geographic coordinate set, it is possible to determine, to some probability, the future location of the user by comparing the GPS coordinates stored this short set of initial records to sequential records stored for the same mobile communication node or other mobile communication nodes in the database. It is probable that some error could be introduced by dilution of GPS coordinates and speed variation, but it is assumed that this will not have a drastic effect on base station settings. A very fast search mechanism should preferably be used to isolate the appropriate records from the sizable database. The record number of the matching stored mobile communication node can then be incremented to the predicted future location of the new mobile communication node. The predicted GPS coordinates are then passed to the data reduction module 344.

Data reduction module 344 contains a set of "optimized" parameters for a given spatial location which have been pre-calculated following the measurement phase. These "optimized" parameters can be determined, for example, by locating the record(s) with the lowest packet retransmission values at each coordinate and assuming that they are the best available or by actual tests and measurement. These optimized parameters are then fed back to the base station 308 by a predictive look up module 350 to reconfigure the mobile communication node's multiple access channel, the settings of the smart antenna array and equalizer, and the gain necessary to reach the mobile communication node. In addition, identification of regions where, regardless of base station settings, connectivity was poor, could be handled by reducing the data rate to mitigate a poor bit error rate and by buffering additional incoming data packets at the base station for later delivery when connectivity improves, as will be described later.

Figure 4:
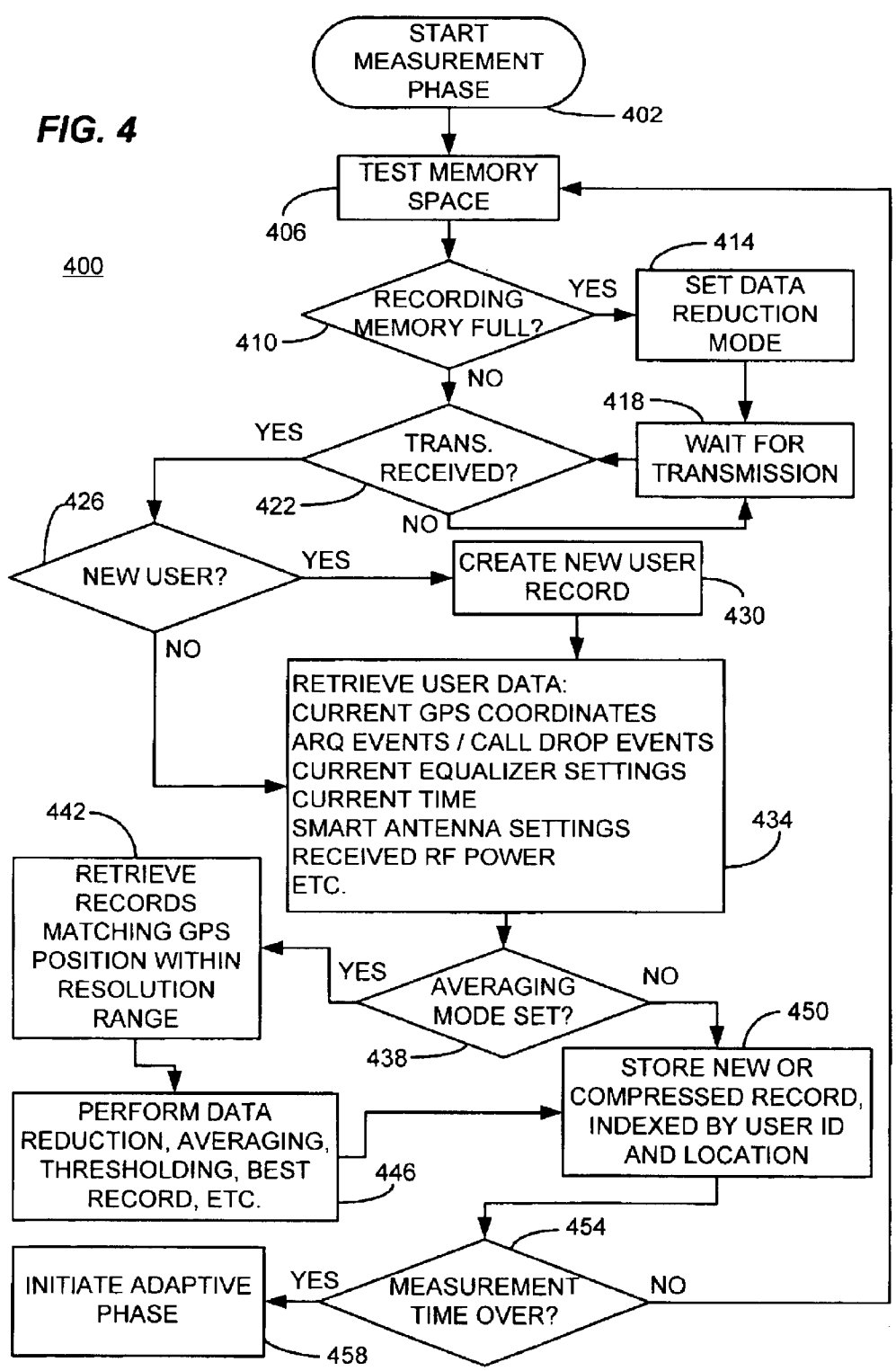
FIG. 4 is a more detailed flow chart describing a data measurement phase of a process consistent with certain embodiments of the present invention.

As previously described, the processes consistent with certain embodiments of the present invention can be viewed as taking place in two distinct phases. FIG. 4 describes in greater detail an exemplary embodiment of the measurement phase as process 400 starting at 402. At the beginning of process 400, which is a process that can be carried out on a periodic or a periodic basis, a memory test is carried out at 406 to verify that the memory 340 is not full. Other routine diagnostics can also be carried out at this time, but have not been discussed for simplicity. If the memory 340 is found to be full at 410, a data reduction mode is enabled to conserve memory at 414. In one embodiment, this data reduction mode is used to eliminate old, obsolete, redundant or unused data. In other embodiments, compaction of the database is carried out. The process then awaits a transmission at 418 until a transmission is received at 422.

When a transmission is received at 422, the process first determines if the transmission relates to a new user (new mobile communication node) at 426. If so, a new record is created at 430 and data are retrieved from the mobile communication node corresponding to this new mobile communication node at 434. As previously described, the retrieved data can include, but is not limited to, current GPS coordinates, ARQ events, call drop events, channel, data rate, equalizer settings, current time, smart antenna settings, received RF power, etc.

Data can be compiled and stored in accordance with embodiments of the present invention using one of several mechanisms. In one mechanism, an averaging mode is used to average and otherwise combine the data received from multiple mobile communication nodes within a particular geographic location into a composite. In another mode, the raw data are simply accumulated within the memory. Other modes will occur to those skilled in the art in light of the present discussion. If an averaging mode is set at 438, records within a matching range of GPS position data are retrieved at 442 and a data reduction process is carried out at 446. Such reduction can include, but is not limited to, averaging certain of the data, capturing upper and lower limits on the data, threshold analysis, etc. After this data reduction process, the compressed record is stored at 450. In the event the averaging mode is not set at 438, the raw data are stored at 450.

Once a data measurement period has expired at 454, an adaptive phase is initiated aat 548. Until that time, control loops from 454 bact to 406 to continue the process of refining and storing the data.

Figure 5:
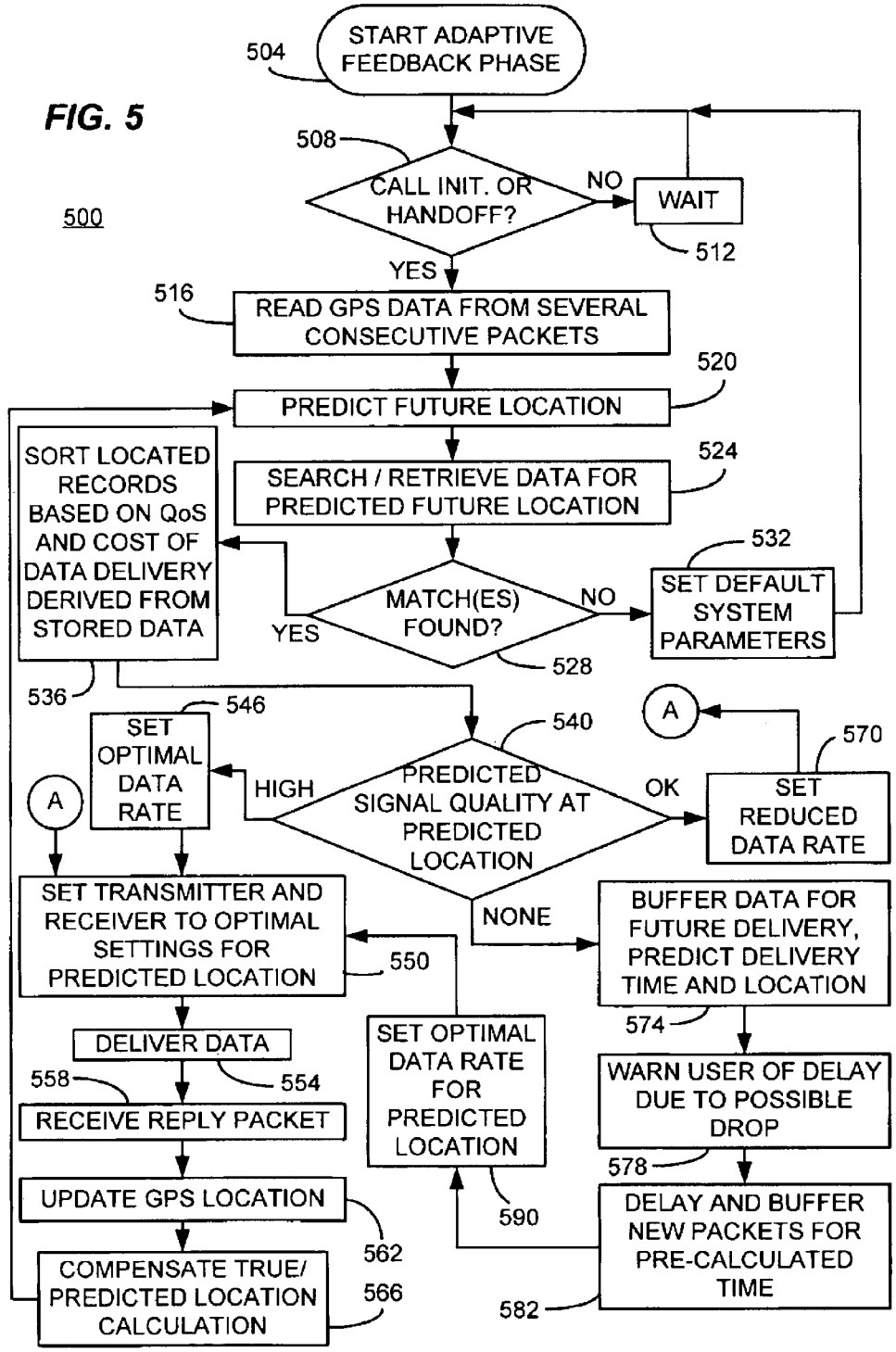
FIG. 5 is a more detailed flow chart describing an adaptive feedback phase of a process consistent with certain embodiments of the present invention.

An exemplary adaptive feedback phase is described as process 500 in connection with FIG. 5 starting at 504. Once this phase is initiated, the base station awaits receipt of a call initiation or handoff at 508. If none is received, the system waits at 512 until a call initiation or handoff is received at 508. Once a call initiation or handoff is received at 508, several consecutive packets of data (e.g., three to five) are read from the mobile communication node at 516 in order to establish a location of the mobile communication node. This data, along with the data in the database, are used to predict a future location and arrival time of the mobile communication node at 520. Once a future location and arrival time are predicted, a search is conducted of the database for mobile communication node parameters for the predicted location at 524. If no matches are found, the base station sets the mobile communication node's parameters to a default configuration at 532 and the process returns to 508 to await the next call initiation or handoff.

If one or more matching records are found in the data at 528, the records are sorted based upon such considerations as quality of service (QoS) and cost of data delivery considerations at 536. The database can at this point provide an indication of the predicted QoS at the predicted future location of the mobile communication node at 540. If the predicted QoS is high at the predicted future location, the data rate can be set or held at a maximum at 546. The mobile communication node's communication parameters are determined at 550 to provide the optimal communication from the predicted location. These communication parameters are then delivered to the mobile communication node at 554 and a reply packet is received at 558. GPS location data are updated from the reply packet at 562 and the predicted location calculation can be refined at 566. The process then loops to 520 so that the mobile communication node's movement is tracked and its communication parameters continually refined to optimize communication.

In the event the predicted future location will support less than optimum communication (shown as "OK" in process 500), a compensation can be implemented by setting a reduced data rate at 570 rather than maximizing the data rate at 546 prior to entering block 550.

It is also possible that a predicted future location has an unacceptably high dropout rate and thus is likely to support no communication or only supports communication with low reliability (e.g., greater than a threshold number of dropouts). This is shown if process 500 as the "none" path from block 540. In this case, data that are destined to be transmitted to or from the mobile communication node can be buffered for future delivery at a predicted time and location that the system estimates will support reliable communication again at 574. At 578, the mobile communication node can be notified of a possible delay due to high potential for dropout so that a warning message can be provided to the user. New packets are then delayed and buffered until the estimated time that the mobile communication node will again enter an area with good communication capability at 582. The data rate can then be set for the maximum supported by the predicted location at 590 and control passes to 550 once the predicted time of arrival in the predicted location arrives.

Figure 6:
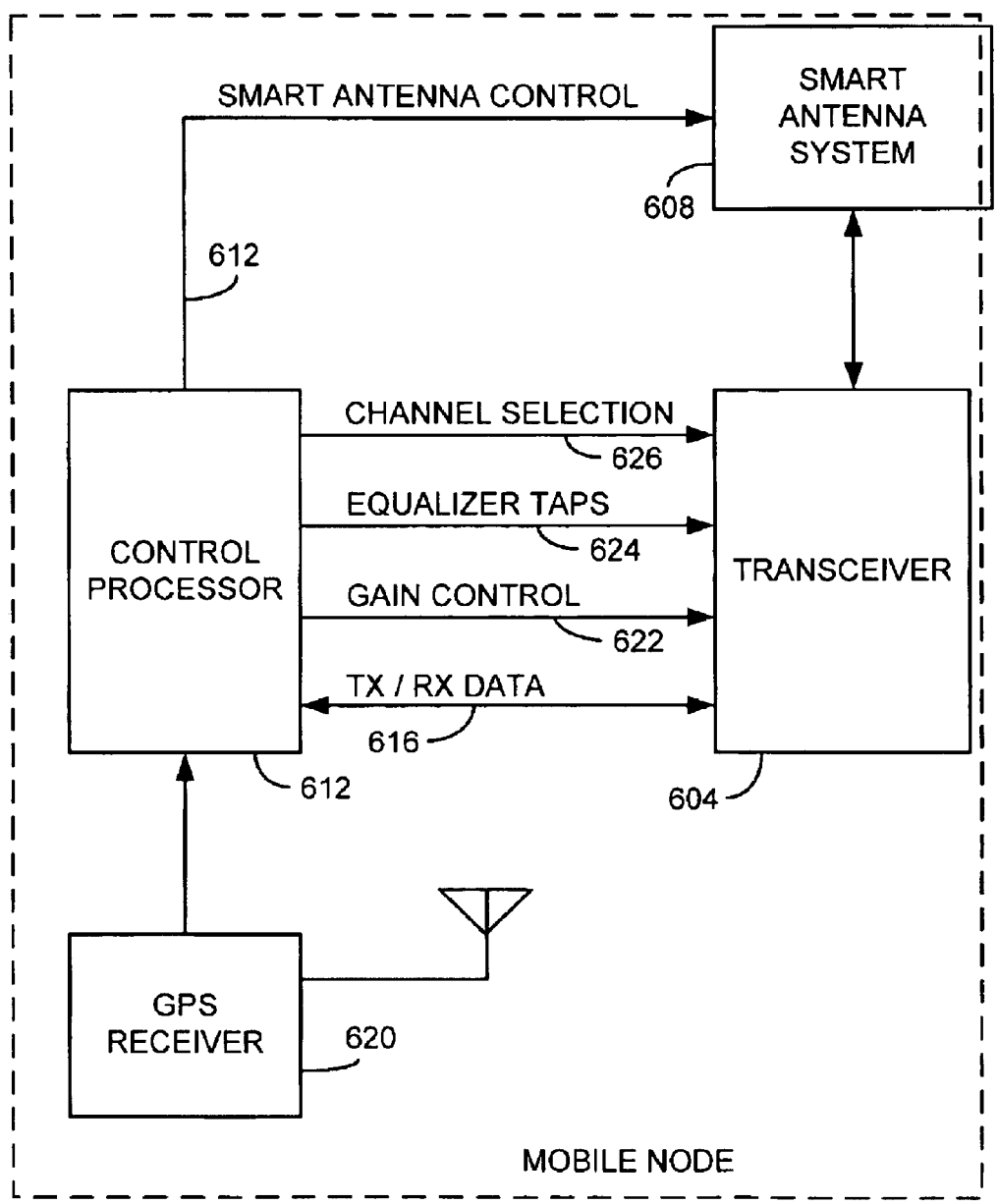
FIG. 6 is a block diagram depicting a mobile communication node such as node 304 consistent with certain embodiments of the present invention.

Thus, a mobile communication node 304 such as that depicted in FIG. 6, in accordance with certain embodiments of the present invention, has a transceiver block 604 with a transmitter and a receiver. Wireless communication is carried out over an antenna system such as a smart antenna system 608. A control processor 612 (e.g., a microcontroller or microprocessor) oversees and controls operation of the various elements of the mobile communication node. The control processor 612 and the transceiver 604 communicate received data and data to be transmitted over a connection 616, which may form part of a data bus. Individual lines of communication are illustrated in this drawing for each type of communication to facilitate understanding of the concepts of the present invention, but this should not be considered limiting.

A GPS receiver 620, or similar positioning system (e.g., Loran, Loran C, Triangulation, etc.) functional block, receives positioning data from the GPS satellite system and provides such data to the control processor 612. Control processor 612 forwards this data to the transceiver for transmission to the base station. Responsive to this positioning data, the base station determines, as best it can, a set of optimal communication parameters for the mobile communication node 304 and sends such parameters back to the mobile communication node. The transceiver 604 receives such parameters and forwards them to the control processor 612 over connection 616. The control processor 612 then decodes such parameters and translates them into instructions for the transceiver 604 and smart antenna system 608. In the exemplary embodiment illustrated, the control processor 612 sends gain control commands 622 and equalizer tap values 624, and channel selection 626 to the transceiver 604. The control processor further sends smart antenna control command settings 628 to the smart antenna system 608. Thus, in response to the GPS position information, the base station predicts a future location of the mobile communication node and is able to set communication parameters of the mobile communication node to adapt to geographic and topological constraints.

Those skilled in the art will recognize that the present invention has been described in terms of exemplary embodiments based upon use of a programmed processor residing at the base station as well as in the mobile communication nodes. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps and associated data used to implement the embodiments described above can be implemented using any suitable electronic storage medium such as for example disc storage devices, Read Only Memory (ROM) devices, Random Access Memory (RAM) devices, optical storage devices, optical network-based storage, magnetic storage devices, magneto-optical storage devices, flash memory and/or other equivalent storage technologies without departing from the present invention. Such alternative storage devices should be considered equivalents.

The present invention, as described in embodiments herein, is implemented using programmed processors executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications, permutations and variations as fall within the scope of the appended claims.

What is claimed is:

1. A communication method, comprising:
   receiving a transmission containing location data for a mobile communication node;
   predicting a future location of the mobile communication node;
   transmitting a signal that adjusts at least one communication parameter of the mobile communication node based upon the predicted future location of the mobile communication; and
   wherein the at least one communication parameter is selected from the following communication parameters: equalizer settings, antenna control settings, data rate and transmitter power settings.

2. The method according to claim 1, wherein the location data are derived from a Global Positioning System (GPS).

3. The method according to claim 1 wherein the predicting comprises:
   receiving multiple sets of location data for the mobile communication node; and
   comparing the multiple sets of location data with stored historical location data to predict a future location.

4. The method according to claim 1, wherein the predicting comprises:
   receiving multiple sets of location data for the mobile communication node and times associated with each set of location data; and
   calculating a predicted location by determining a direction and a velocity for movement of the mobile communication node.

5. The method according to claim 1, wherein the predicted future location historically supports degraded communication quality of service compared to an optimal, and wherein the communication parameter reduces a data rate of the mobile communication node.

6. The method according to claim 1, wherein the predicted future location historically is unable to support a satisfactory communication quality of service, and further comprising:
buffering data destined to the mobile communication node until a time when the communication quality of service is predicted to be satisfactory.

7. The method according to claim 1, wherein the predicting comprises retrieving historical communication parameters from a database.

8. The method according to claim 7, wherein the retrieving comprises retrieving data indexed by one of a mobile communication node identifier and a geographic location.

9. A communication method, comprising:
transmitting a data packet from a mobile communication node to a base station, the data packet containing location data representing a geographic location of the mobile communication node;
receiving a data packet from the base station that adjusts at least one communication parameter of the mobile communication node, the at least one communication parameter being based upon the geographic location of the mobile communication node; and
wherein the at least one communication parameter is selected from the following communication parameters: equalizer settings, antenna control settings, data rate and transmitter power settings.

10. The method according to claim 9, wherein the location data are derived from a Global Positioning System (GPS).

11. The method according to claim 9, wherein the at least one communication parameter is based upon a predicted geographic location of the mobile communication node.

12. The method according to claim 11, wherein the predicted geographic location is predicted by comparing the multiple sets of location data with stored historical location data to predict a future location.

13. The method according to claim 11, wherein the predicted geographic location is predicted by determining a direction and a velocity for movement of the mobile communication node.

14. The method according to claim 11, wherein the predicted future location historically supports degraded communication quality of service compared to an optimal, and wherein the communication parameter reduces a data rate of the mobile communication node.

15. The method according to claim 11, wherein the predicted future location historically is unable to support a satisfactory communication quality of service, and further comprising:
buffering data destined to the mobile communication node until a time when the communication quality of service is predicted to be satisfactory.

16. The method according to claim 11, wherein the predicting comprises retrieving historical communication parameters from a database.

17. The method according to claim 16, wherein the retrieving comprises retrieving data indexed by one of a mobile communication node identifier and a geographic location.

18. A mobile communication node, comprising:
a positioning device that determines a geographic location of the communication node;
a transceiver that transmits data representing the geographic location and receives data representing communication parameters determined as a function of the data representing the geographic location;
means for adjusting at least one communication parameter of the communication node in response to receipt of the data representing communication parameters; and
wherein the at least one communication parameter is selected from the following communication parameters: equalizer settings, antenna control settings, data rate and transmitter power settings.

19. The mobile communication node according to claim 18, wherein the positioning device derives position information from a Global Positioning System (GPS).

20. The mobile communication node according to claim 18, wherein the at least one communication parameter is selected from the following communication parameters: channel, equalizer settings, antenna control settings, data rate and transmitter power settings.

21. The mobile communication node according to claim 18, wherein the at least one communication parameter is based upon a predicted geographic location of the mobile communication node.

22. The mobile communication node according to claim 21, wherein the predicted geographic location is predicted by comparing the multiple sets of location data with stored historical location data to predict a future location.

23. The mobile communication node according to claim 21, wherein the predicted geographic location is predicted by determining a direction and a velocity for movement of the mobile communication node.

24. The mobile communication node according to claim 21, wherein the predicted future location historically supports degraded communication quality of service compared to an optimal, and wherein the communication parameter reduces a data rate of the mobile communication node.

25. The mobile communication node according to claim 21, wherein the predicted future location historically is unable to support a satisfactory communication quality of service, and further comprising means for buffering data from the mobile communication node until a time when the communication quality of service is predicted to be satisfactory.

26. A wireless communication base station, comprising:
a database storing data that relates communication parameters to a geographic location;
a receiver that receives data packets containing data describing a geographic location of a mobile communication node;
means for predicting a future geographic location of the mobile communication node by reference to the database; and
a transmitter that transmits at least one communication parameter to the mobile communication node associated with the predicted geographic and
wherein the at least one communication parameter is selected from the following communication parameters: equalizer settings, antenna control settings, data rate and transmitter power settings.

27. The wireless communication base station according to claim 26, wherein the data describing a geographic location is derived from a Global Positioning System (GPS).

28. The wireless communication base station according to claim 26, wherein the predicted geographic location is predicted by comparing the multiple sets of location data with stored historical location data to predict the geographic location.

29. The wireless communication base station according to claim 26, wherein the predicted geographic location is predicted by determining a direction and a velocity for movement of the mobile communication node.

30. The wireless communication base station according to claim 26, wherein the predicted future location historically supports degraded communication quality of service compared to an optimal, and wherein the communication parameter reduces a data rate of the mobile communication node.

31. The wireless communication base station according to claim 26, wherein the predicted future location historically is unable to support a satisfactory communication quality of service, and further comprising means for buffering data destined for the mobile communication node until a time when the communication quality of service is predicted to be satisfactory.

32. The wireless communication base station according to claim 26, wherein the predicting comprises retrieving historical communication parameters from a database.

33. The wireless communication base station according to claim 32, wherein the retrieving comprises retrieving data indexed by one of a mobile communication node identifier and a geographic location.

34. A communication method, comprising:
receiving a data packet transmitted from a mobile communication node to a base station, the data packet containing location data representing a geographic location of the mobile communication node;
adjusting at least one communication parameter of the mobile communication node based upon the geographic location of the mobile communication node; and
wherein the at least one communication parameter is selected from the following communication parameters: equalizer settings, antenna control settings, data rate and transmitter power settings.

35. The method according to claim 34, wherein the location data are derived from a Global Positioning System (GPS).

36. The method according to claim 34, wherein the at least one communication parameter is based upon a predicted geographic location of the mobile communication node.

37. The method according to claim 36, wherein the predicted geographic location is predicted by comparing the multiple sets of location data with stored historical location data to predict a future location.

38. The method according to claim 36, wherein the predicted geographic location is predicted by determining a direction and a velocity for movement of the mobile communication node.

39. The method according to claim 36, wherein the predicted future location historically supports degraded communication quality of service compared to an optimal, and wherein the communication parameter reduces a data rate of the mobile communication node.

40. The method according to claim 36, wherein the predicted future location historically is unable to support a satisfactory communication quality of service, and further comprising:
buffering data destined to the mobile communication node until a time when the communication quality of service is predicted to be satisfactory.

41. The method according to claim 36, wherein the predicting comprises retrieving historical communication parameters from a database.

42. The method according to claim 41, wherein the retrieving comprises retrieving data indexed by one of a mobile communication node identifier and a geographic location.

43. An electronic storage medium storing instructions which, when executed on a programmed processor, carry out a communication method, comprising:
receiving a data packet transmitted from a mobile communication node to a base station, the data packet containing location data representing a geographic location of the mobile communication node; and
adjusting at least one communication parameter of the mobile communication node based upon the geographic location of the mobile communication and wherein the at least one communication parameter is selected from the following communication parameters: equalizer settings, antenna control settings, data rate and transmitter power settings.

44. A wireless communication base station, comprising:
a database storing data that relates communication parameters to a geographic location;
a receiver that receives data packets containing data describing a geographic location of a mobile communication node;
means for predicting a future geographic location of the mobile communication node by reference to the database;
means for adjusting at least one communication parameter of the mobile communication node based upon the predicted geographic location; and
wherein the at least one communication parameter is selected from the following communication parameters: equalizer settings, antenna control settings, data rate and transmitter power settings.

45. An electronic storage medium storing instructions which, when executed on a programmed processor, carry out a communication method, comprising:
receiving a transmission containing location data for a mobile communication node;
predicting a future location of the mobile communication node;
transmitting a signal that adjusts at least one communication parameter of the mobile communication node based upon the predicted future location of the mobile communication node; and
wherein the at least one communication parameter is selected from the following communication parameters: equalizer settings, antenna control settings, data rate and transmitter power settings.

46. An electronic storage medium storing instructions which, when executed on a programmed processor, carry out a communication method, comprising:
transmitting a data packet from a mobile communication node to a base station, the data packet containing location data representing a geographic location of the mobile communication node;
receiving a data packet from the base station that adjusts at least one communication parameter of the mobile communication node, the at least one communication parameter being based upon the geographic location of the mobile communication node; and
wherein the at least one communication parameter is selected from the following communication parameters: equalizer settings, antenna control settings, data rate and transmitter power settings.

47. A communication system, comprising:
a mobile communication node;
a base station;

wherein the mobile communication node comprises:
  a Global Positioning System (GPS) positioning device that determines a geographic location of the communication node;
  a transceiver that transmits data representing the geographic location and receives data representing communication parameters determined as a function of the data representing the geographic location; and
  means for adjusting at least one communication parameter of the mobile communication node in response to receipt of the data representing communication parameters, wherein the at least one communication parameter is based upon a predicted geographic location of the mobile communication node;
and, wherein the base station comprises:
  a database storing data that relates communication parameters to geographic location;
  a receiver that receives the data packets containing data describing a geographic location of a mobile communication node;
  means for predicting the future geographic location of the mobile communication node by retrieving historical information indexed by one of a mobile communication node identifier and a geographic location parameter from the database; and
  a transmitter that transmits at least one communication parameter to the mobile communication node associated with the predicted geographic location; and wherein the at least one communication parameter is selected from the following communication parameters: channel, equalizer settings, antenna control settings, data rate and transmitter power settings.

48. The communication system according to claim 47, wherein the predicted geographic location is predicted by comparing the multiple sets of location data with stored historical location data to predict a future location.

49. The communication system according to claim 47, wherein the predicted geographic location is predicted by determining a direction and a velocity for movement of the mobile communication node.

50. The communication system according to claim 47, wherein the predicted future location historically supports degraded communication quality of service compared to an optimal, and wherein the communication parameter reduces a data rate of the mobile communication node.

51. The communication system according to claim 47, wherein the predicted future location historically is unable to support a satisfactory communication quality of service, and further comprising means for buffering data between the base station and the mobile communication node until a time when the communication quality of service is predicted to be satisfactory.

* * * * *

UNITED STATES PATENT AND TRADEMARK OFFICE
CERTIFICATE OF CORRECTION

PATENT NO. : 6,750,813 B2
DATED : June 13, 2004
INVENTOR(S) : Vargas-Hurlston et al.

It is certified that error appears in the above-identified patent and that said Letters Patent is hereby corrected as shown below:

Column 7,
Line 48, change "a periodic" to -- aperiodic --

Signed and Sealed this

Seventh Day of December, 2004

JON W. DUDAS
*Director of the United States Patent and Trademark Office*